United States Patent [19]

Reed et al.

[11] 4,296,662

[45] Oct. 27, 1981

[54] METHOD OF AND APPARATUS FOR CUTTING SHEETS OF GLASS

[75] Inventors: Ronald R. Reed, Toledo; William F. Crone, Jr., Bowling Green; G. Robert Meyer, Toledo, all of Ohio

[73] Assignee: Libbey-Owens-Ford Company, Toledo, Ohio

[21] Appl. No.: 130,746

[22] Filed: Mar. 17, 1980

[51] Int. Cl.³ .................. B26D 3/08; C03B 33/02
[52] U.S. Cl. ............................ 83/880; 83/155; 83/253; 83/269; 83/486.1; 83/886; 225/2
[58] Field of Search ............... 83/880, 879, 262, 253, 83/251, 269, 886, 155, 486.1; 225/2, 96, 96.5

[56] References Cited

U.S. PATENT DOCUMENTS

| | | | |
|---|---|---|---|
| 1,982,880 | 12/1934 | Pachfer | 83/269 |
| 2,196,684 | 4/1940 | Rodder et al. | 83/262 X |
| 3,027,646 | 4/1962 | Brichard et al. | 33/32 |
| 3,181,757 | 5/1965 | O'Dell et al. | 225/96.5 |
| 3,244,338 | 4/1966 | Ritter, Jr. et al. | 225/96.5 |
| 3,286,893 | 11/1966 | Zellers, Jr. | 225/2 |
| 3,424,357 | 1/1969 | Curtze et al. | 225/2 |
| 3,605,540 | 9/1971 | Williams et al. | 83/269 X |
| 3,913,812 | 10/1975 | Augustin et al. | 225/2 |

Primary Examiner—Frank T. Yost
Attorney, Agent, or Firm—Collins, Oberlin & Darr

[57] ABSTRACT

A method of and apparatus for scoring block size glass sheets into shapes for further fabricating into automotive windshields, side lights and the like. The apparatus includes a continuously operating conveyor for advancing the block size glass sheets to and from a scoring station, including a sheet capturing mechanism whereat a sheet is captured and held in a predetermined position on an operating roll conveyor beneath a positionable scoring unit which produces at least one score line on the glass sheet along a predetermined path. Thus the scored sheet, when released, is quickly conveyed away from the scoring station.

11 Claims, 12 Drawing Figures

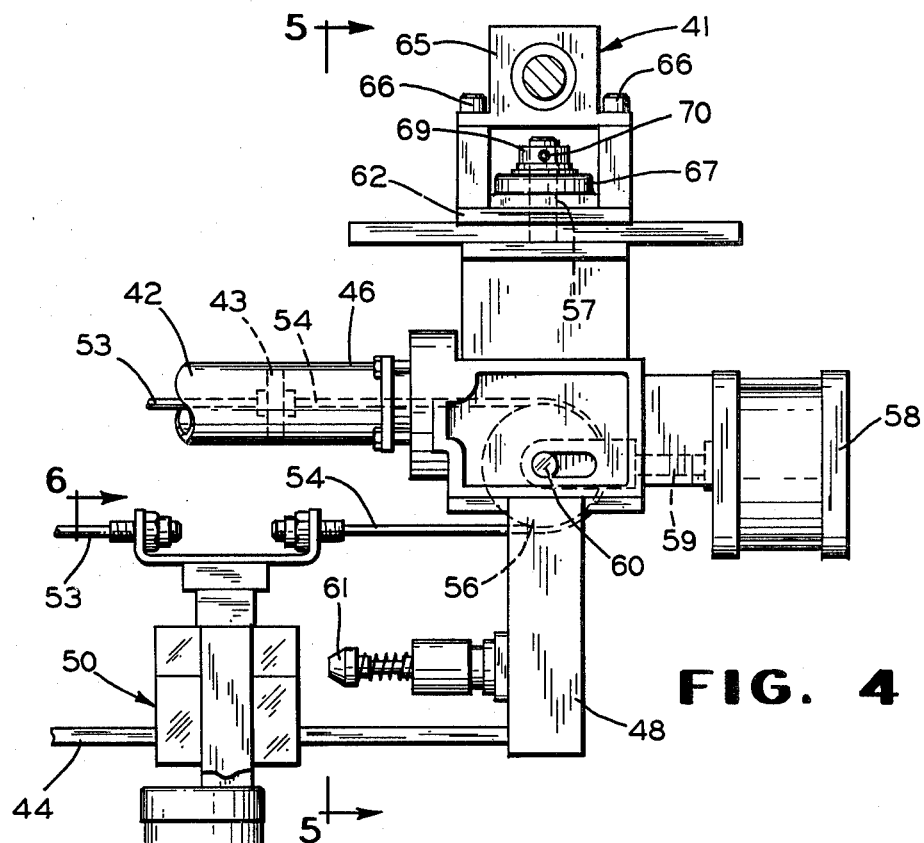
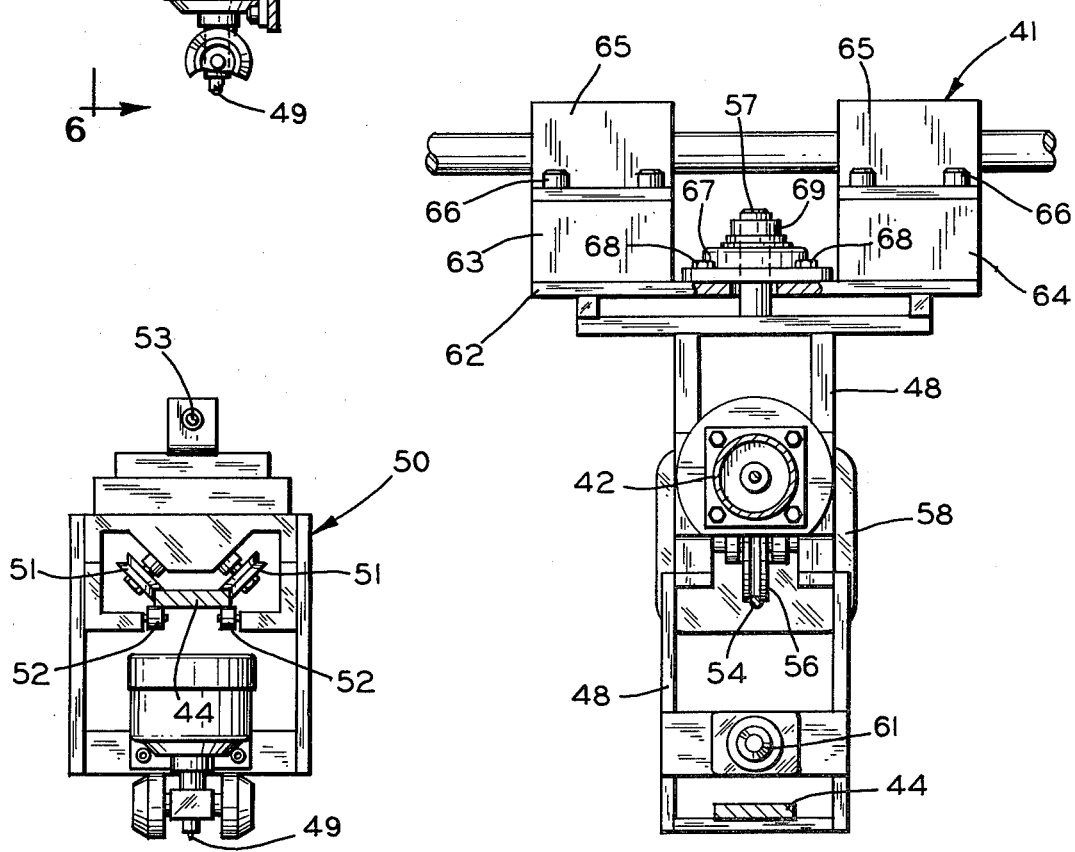
FIG. 4
FIG. 6    FIG. 5

METHOD OF AND APPARATUS FOR CUTTING SHEETS OF GLASS

BACKGROUND OF THE INVENTION

1. Field of the Invention

The present invention generally relates to the cutting of sheets of glass and, more particularly, to a method of and apparatus for cutting rectilinear sheets of glass into shapes having oblique angles.

2. Description of the Prior Art

In fabricating articles from block size sheets of glass on a high volume production basis such as encountered in producing glazing closures for automobiles, it is necessary to direct the block size sheets of glass into cutting lines where they are scored and their cuts run to form smaller blanks of predetermined sizes and shapes. Of course, during production of the raw glass the block size sheets of glass can be produced at a much faster rate than the smaller blanks. Thus, it is desirable to provide a method and apparatus for quickly and accurately producing specifically sized and shaped smaller blanks from block size sheets of glass and handling the smaller blanks at a high rate of production.

SUMMARY OF THE INVENTION

The present invention facilitates the cutting of block size glass sheets into smaller blanks of predetermined size and shape at a much faster rate than was heretofore possible. Generally, the present invention contemplates advancing large size glass blanks to and from a scoring station along a continuously running conveyor, capturing a glass blank at the scoring station, orienting it in a predetermined position on an operating conveyor, scoring the blank along a predetermined path and then releasing the captured blank whereby it is quickly conveyed away from the scoring station.

Accordingly, the invention comprises an apparatus employing operating conveyors for continuously conveying the block size sheets of glass to and from the scoring station and devices for capturing and orienting a glass sheet on an operating conveyor beneath a travelling, positionable scoring unit whereat the oriented captured glass sheet may be quickly scored, released and conveyed away from the scoring station at a high volume of production.

OBJECTS AND ADVANTAGES

An object of this invention is to provide an improved method and apparatus for quickly and accurately cutting sheets of glass into desired sizes and shapes.

Another object of this invention is to provide a method and apparatus capable of cutting rectilinear sheets of glass along predetermined oblique lines.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 4 is an enlarged fragmentary elevational view, looking in the direction of line 4—4 in FIG. 3;

FIG. 5 is an enlarged fragmentary transverse view looking in the direction of line 5—5 in FIG. 4;

FIG. 6 is an enlarged fragmentary transverse view looking in the direction of line 6—6 in FIG. 4;

DESCRIPTION OF THE PREFERRED EMBODIMENT

Figure 1:
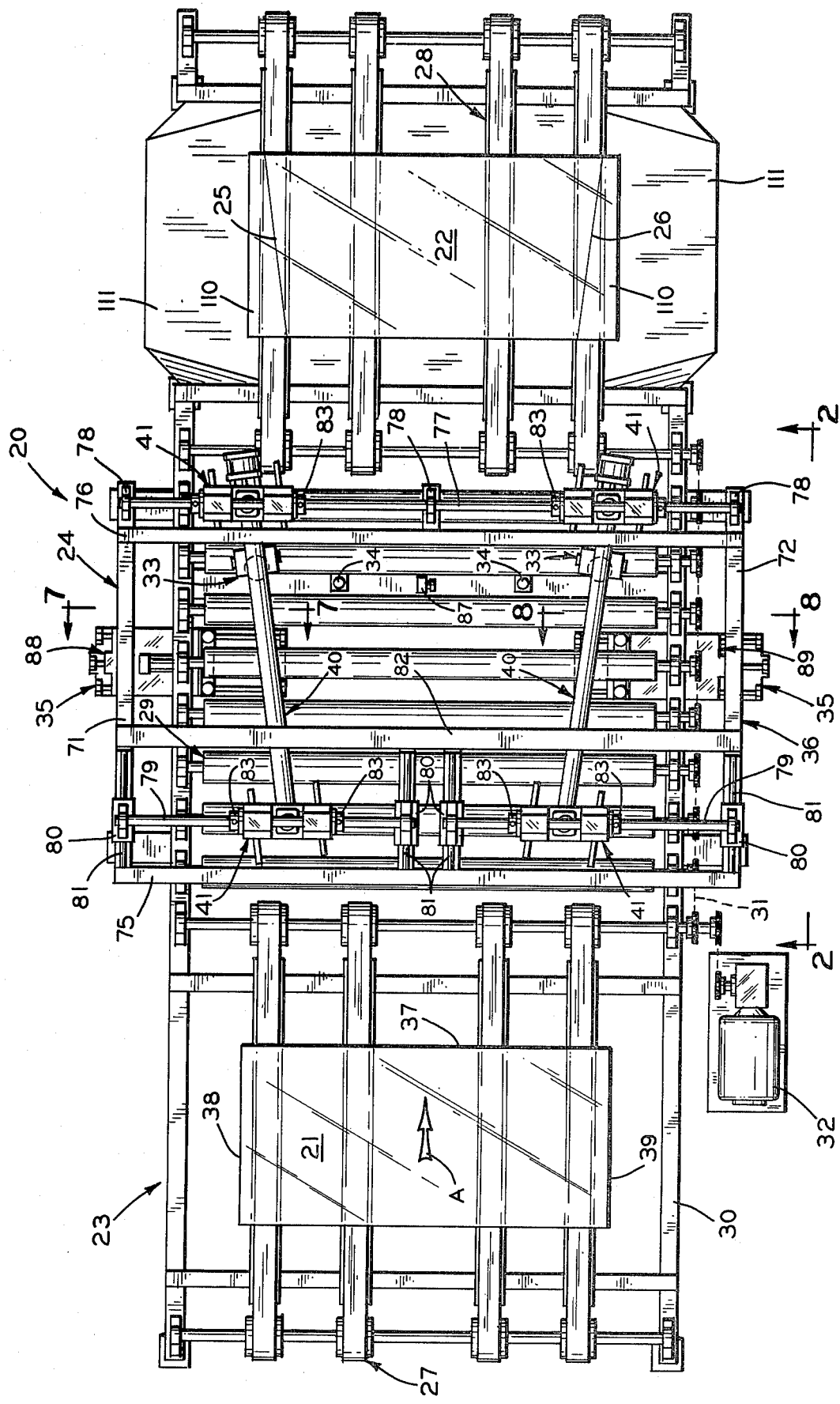
FIG. 1 is a plan view of an apparatus constructed in accordance with the invention for quickly scoring glass sheets along predetermined lines.
Figure 2:
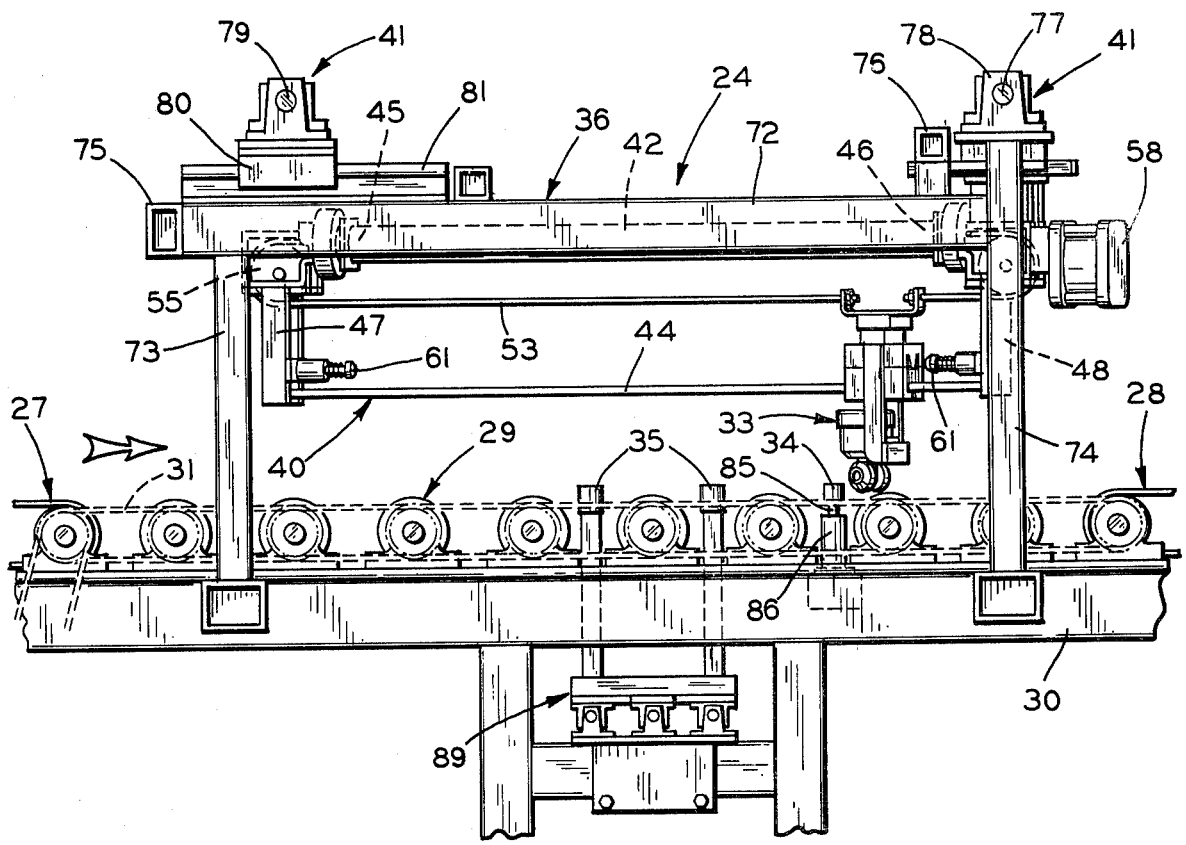
FIG. 2 is an enlarged longitudinal elevational view of the scoring station employed in the apparatus of FIG. 1 and looking in the direction of line 2—2 thereof.

Referring now to the drawings, and particularly to FIGS. 1 and 2, there is illustrated an apparatus designated in its entirety by the reference numeral 20 for scoring block size glass sheets 21 into shaped pattern blanks 22 for further fabrication. The apparatus 20 generally comprises a conveyor line 23 for moving the block size glass sheets 21 in a rectilinear path and a scoring station indicated by the reference numeral 24 which is located in the central portion of the conveyor line 23 for producing a pair of score lines 25 and 26 on the sheets 21, thus forming the pattern blanks 22.

As illustrated in FIG. 1, the conveyor line 23 includes a pair of aligned multiple-belt conveyors 27 and 28 separated by an intermediate roll conveyor 29 forming part of the scoring station 24. Each conveyor is conventionally mounted on a common main frame 30 and commonly driven in known manner by a chain mechanism 31 driven by a gear reduction drive unit 32. The belt conveyor 27 conveys the block size glass sheets 21 to the scoring station 24 and the belt conveyor 28 conveys the scored pattern blanks 22 away from the scoring station 24. Since the conveyors 27, 28 and 29 are conventional structures, no further description is deemed necessary.

Referring now to FIGS. 1 and 2, the scoring station 24 generally includes the roll conveyor 29, two travelling scoring units 33, a sheet capturing device 34 for holding a glass sheet 21 stationary on the conveyor 29, and a sheet positioning mechanism 35 for precisely orienting the stationarily held glass sheet 22 beneath the scoring units 33. More particularly, an overhead frame 36, on which the scoring units 33 are positionably mounted, is provided on the main frame 30 to overlie the roll conveyor 29. The capturing device 34 and positioning mechanism 35 are mounted on the main frame 30 in a manner to be described hereinafter to engage the leading edge 37 and longitudinal sides 38 and 39, respectively, of the glass sheet 21 for properly locating the sheet 21 on the conveyor 29 beneath the scoring units 33.

In the embodiment of the invention illustrated in FIG. 1, the block size glass sheet 21 is to be shaped into the pattern blank for processing into an automotive windshield. In this case, the score lines 25 and 26 extend along the opposed sides 38 and 39, respectively, of the glass sheet 21, at an oblique angle from the leading edge 37 of the sheet 21. Thus, the overhead frame 36 in this embodiment of the invention is provided with means for supporting a scoring unit 33 along each longitudinal side of the roll conveyor 29. More specifically, each scoring unit 33 is independently, positionably mounted from the ends of the frame 36 to extend, longitudinally along the conveyor 29.

Referring now to FIG. 2, each scoring unit 33 is mounted to traverse the glass sheet 21. To this end, each scoring unit 33 is suspended from an elongated mounting structure 40, each of whose opposed ends is pivotally mounted in a hanger assembly 41, each hanger assembly being movably mounted on the frame 36 in a manner to be described hereinafter. Briefly, the elongated structure 40 is an open, substantially rectangular framework disposed in a vertical plane, generally comprising an upper elongated power cylinder 42 having a piston 43 (see FIG. 4) and a lower rail 44 suspended from the opposed ends 45 and 46 of the power cylinder by depending brackets 47 and 48, respectively.

The scoring unit 33, as illustrated in FIGS. 4 and 6, includes a scoring tool 49 carried by a carriage 50 mounted on the rail 44 which is moved therealong by the power cylinder 42. More specifically, as best illustrated in FIG. 6, the carriage 50 is provided with an upper pair of grooved guide wheels 51 and a lower pair of hold-down wheels 52, each pair cooperating with and rolling along the rail 44 to guide the carriage in a rectilinear path. Each end of the carriage 50 is fixed to cables 53 and 54 which run around pulleys 55 and 56, respectively, the cables 53 and 54 being fixed to the piston 43 to pull the carriage in either direction along the rail 44.

Referring now to FIGS. 4 and 5, the top of each bracket 47 and 48 is provided with an upstanding pivot pin 57 for pivotally connecting it to its respective hanger assembly 41. The bracket 48 may be provided with a power cylinder 58 having a piston rod 59 connected to a shaft 60 mounting the pulley 56 for moving the pulley 56 in a rectilinear path for properly tensioning the cables 53 and 54. Also, each bracket 47 and 48 may be provided with a spring cushion bumper device 61 against which an end of the carriage 50 abuts at the extent of its travel in either direction (see FIG. 2).

Figure 3:
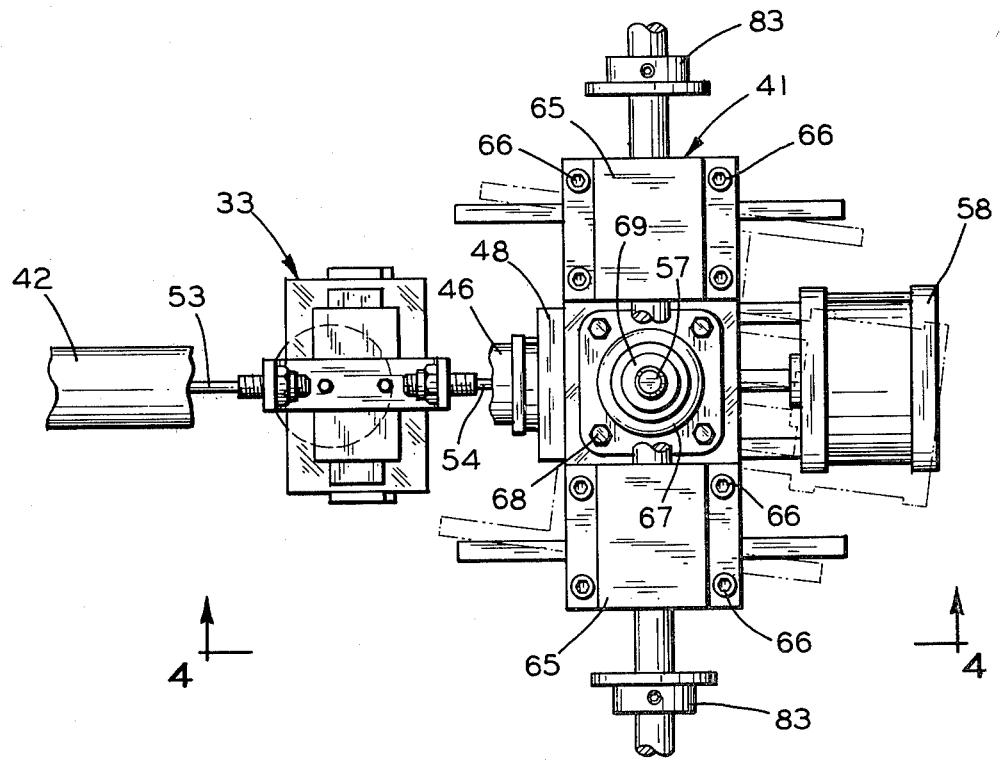
FIG. 3 is an enlarged fragmentary plan view of one end of the cutting unit employed in the apparatus.

Referring now to FIGS. 3, 4 and 5, each hanger assembly 41 generally includes a rectangular shaped base plate 62 having two pairs of aligned spaced-apart upstanding pedestals 63 and 64. A bearing block 65 is mounted by a plurality of cap screws 66 on each of the pairs of pedestals 63 and 64, the bearing blocks being in axial alignment with each other (see FIG. 5). The central portion of the base plate 62 is provided with a mounting device 67 fixed thereto by cap screws 68 for receiving the upstanding pivot pin 57 fixed to each bracket 47 and 48, which pin 57 is secured in pivotable relationship thereto by a locking collar 69, having a locking set screw 70.

In order to positionably suspend each end of the mounting structure 40 above the roll conveyor 29, the overhead frame 36 generally comprises an upper level of transversely spaced, longitudinally extending support beams 71 and 72. As illustrated in FIGS. 1 and 2, each beam 71 and 72 is supported by an aligned pair of stanchions 73 and 74 affixed to the main frame 30 at the portion thereof supporting the roll conveyor 29. The beams 71 and 72 may be tied together by transversely extending cross braces 75 and 76 as illustrated, for forming a rigid structure.

The downstream end of the frame 36 in reference to the arrow "A" in FIG. 1, is provided with a transversely extending rail 77 for slidably mounting the hanger 41 at one end of each mounting frame 40. For this purpose, each end of the rail 77 is supported in a mounting block 78 fixed to the downstream end of the beams 71 and 72, thus stationarily supporting the rail 77 on the frame 36. In order to lend rigidity to the rail 77, the central portion thereof also may be supported by a mounting block 78 fixed to the cross brace 76 of the frame 36.

The upstream end of the frame 36 is provided with two transversely extending, longitudinally movable rails 79 for mounting the hangers 41 at the other end of each mounting structure 40, thus providing both transverse and longitudinal movement of that end of each mounting structure for accommodating different desired positions of the scoring units 33. To this end, each end of the movable rail 79 is supported in a slide block 80 slidably mounted on longitudinally extending guide rails 81 mounted on the frame 36. More specifically, the guide rails 81 are mounted in pairs, one being fixed to the upstream end of beams 71 and 72 and the other being fixed to and extending between the cross brace 75 and an intermediate cross brace 82 fixed to the frame 36. Accordingly, the hangers 41 suspending each mounting frame 40 between the fixed rail 77 and the longitudinally movable rail 79 permit the frame 40 to be located in any desired position. Locking collars 83 surrounding the rails 77 and 79 and located at each end of the hangers 41 secure each hanger 41 in a desired position relative thereto.

Referring now to FIGS. 1 and 2, the glass sheet capturing device 34 is located on the downstream side of the scoring station 24 for holding a glass sheet 21 stationary beneath the scoring units 33. The capturing device 34 may comprise a pair of transversely spaced, vertically movable stop pins 84 which are adapted to engage the leading edge 37 of the glass sheet 21. To this end, each stop pin 84 may comprise a piston rod 85 of a double-acting power cylinder 86 mounted on the main frame 30 with the piston rod 85 projecting upwardly between adjacent rolls of the roll conveyor 29. The operation of the power cylinders 86 may be controlled by a limit switch 87 (see FIG. 1) adapted to engage the leading edge 37 of the glass sheet 21. As best illustrated in FIG. 2, the piston rods 85 are extended to capture the glass sheet 21 and retracted to permit the roll conveyor 29 to advance the sheet to the next station.

Figure 7:
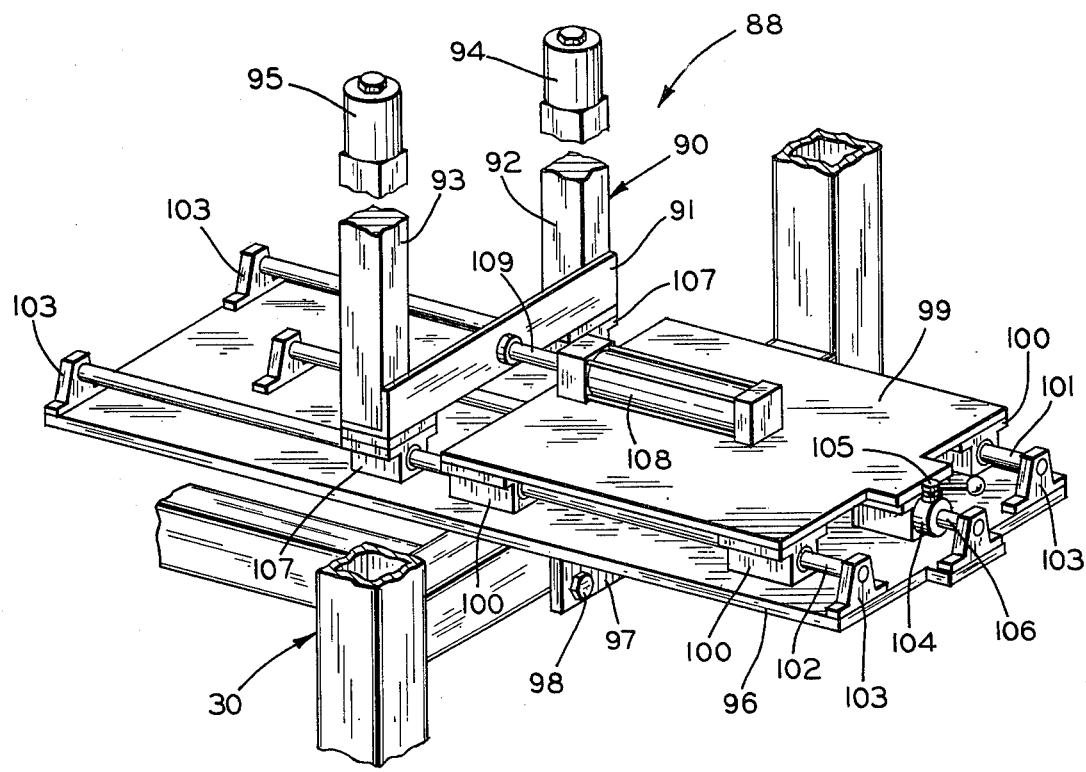
FIG. 7 is an enlarged fragmentary perspective view of the positioning mechanism employed in the apparatus and looking in the direction of line 7—7 in FIG. 1.
Figure 8:
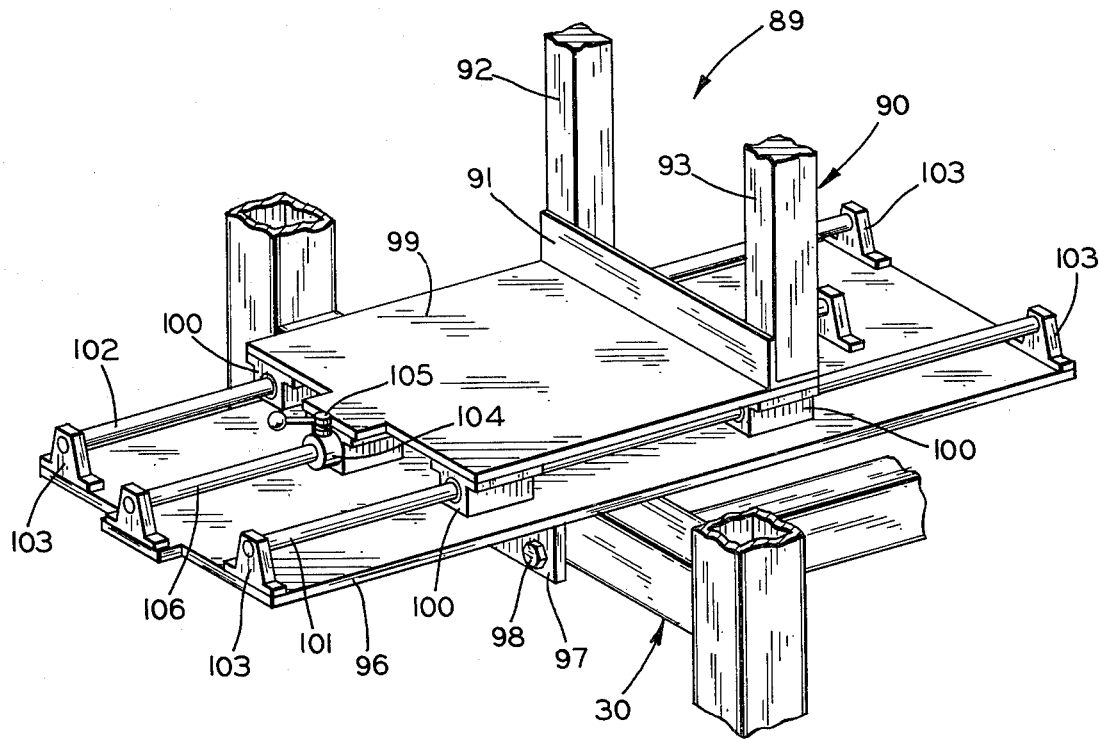
FIG. 8 is an enlarged fragmentary perspective view looking in the direction of line 8—8 in FIG. 1.

Referring now to FIGS. 1, 7 and 8, the positioning mechanism 35 for properly locating the glass sheet 21 beneath the scoring units 33 includes a pusher unit 88 for moving the glass sheet 21 against a stop unit 89. The units 88 and 89 each includes an upright U-shaped member 90 (see FIGS. 7 and 8) having a base 91 and upright legs 92 and 93 which project upwardly above the top of rolls of the roll conveyor 29. The ends of the legs 92 and 93 are provided with rotary roller shoes 94 and 95, respectively. The U-shaped member 90 of each of the units 88 and 89 is positionably mounted on the frame 30 for accommodating different size glass sheets 21 and in alignment with each other on opposed sides of the roll conveyor 29 (see FIG. 1).

Accordingly, as best illustrated in FIGS. 7 and 8, each of the units 88 and 89 includes a horizontally disposed, rectangularly shaped base plate 96 provided on each opposed side of the main frame 30 by means of brackets 97 and bolts 98 for supporting the units 88 and 89. A support plate 99 is slidably mounted on each base plate 96 by means of sliding type bearing blocks 100 fixed to the plate 99 which are adapted to slide along a pair of parallel, spaced-apart rails 101 and 102 fixedly secured to the base plate 96 by mounting blocks 103. A locking collar 104 having a set screw 105 is provided at the central portion of the support plate 99 in a manner to surround a rod 106 fixed to the base plate 96 intermediate of and parallel to the rails 101 and 102 for securing each support plate 99 in a desired position relative to the conveyor 29.

Referring now to FIG. 7, the U-shaped member 90 of the pusher unit 88 is slidably mounted on the rails 101 and 102 by means of bearing blocks 107 fixed to the base 91 of the U-shaped member 90. A power cylinder 108 having a piston rod 109 connected to the U-shaped member 90 is mounted on the support plate 99 for moving the pusher unit 88 to and fro along the rails 101 and 102. The stop unit 89, as illustrated in FIG. 8, is mounted directly on the support plate 99 and serves as an abutment for the glass sheet 21. Accordingly, once the positions of the pusher unit 88 and stop unit 89 are set, the shoes 94 and 95 of the pusher unit 88 can engage the side 38 of the glass sheet 21 to move it transversely across the roll conveyor 29 until the side 39 abuts the shoes 94 and 95 of the stop unit 89, thus orienting the glass sheet in a predetermined location between the scoring units 33.

Also, in the embodiment of the invention illustrated in FIG. 1, the belt conveyor 28 may include conventional breaking devices (not shown) along each side thereof for separating the selvaged edges 110 from the scored pattern blank 22 and chutes 111 for directing the broken edges into a suitable receptacle (not shown).

In the embodiment of the invention illustrated in FIGS. 9 through 12 the apparatus, designated in its entirety by the numeral 20a, is designed to split the block size glass sheets 21 into two individual like-shaped pattern blanks 22a adapted for further processing such as, for example, into automotive side lights. Accordingly, only one cutting unit 33 is required and in this case, the overhead frame 36a is provided with two longitudinally spaced, transversely extending mounting rails 77a and 112. The rail 77a is mounted on the downstream end of the frame 36a in the manner previously described and the rail 112 is mounted to move longitudinally along the upstream end of the frame 36a. More specifically, the ends of the rail 112 are supported in slide blocks 113 and 113a slidably mounted on guide rails 81a fixed to the beams 71a and 72a of the frame 36a in the manner previously described.

Figure 9:
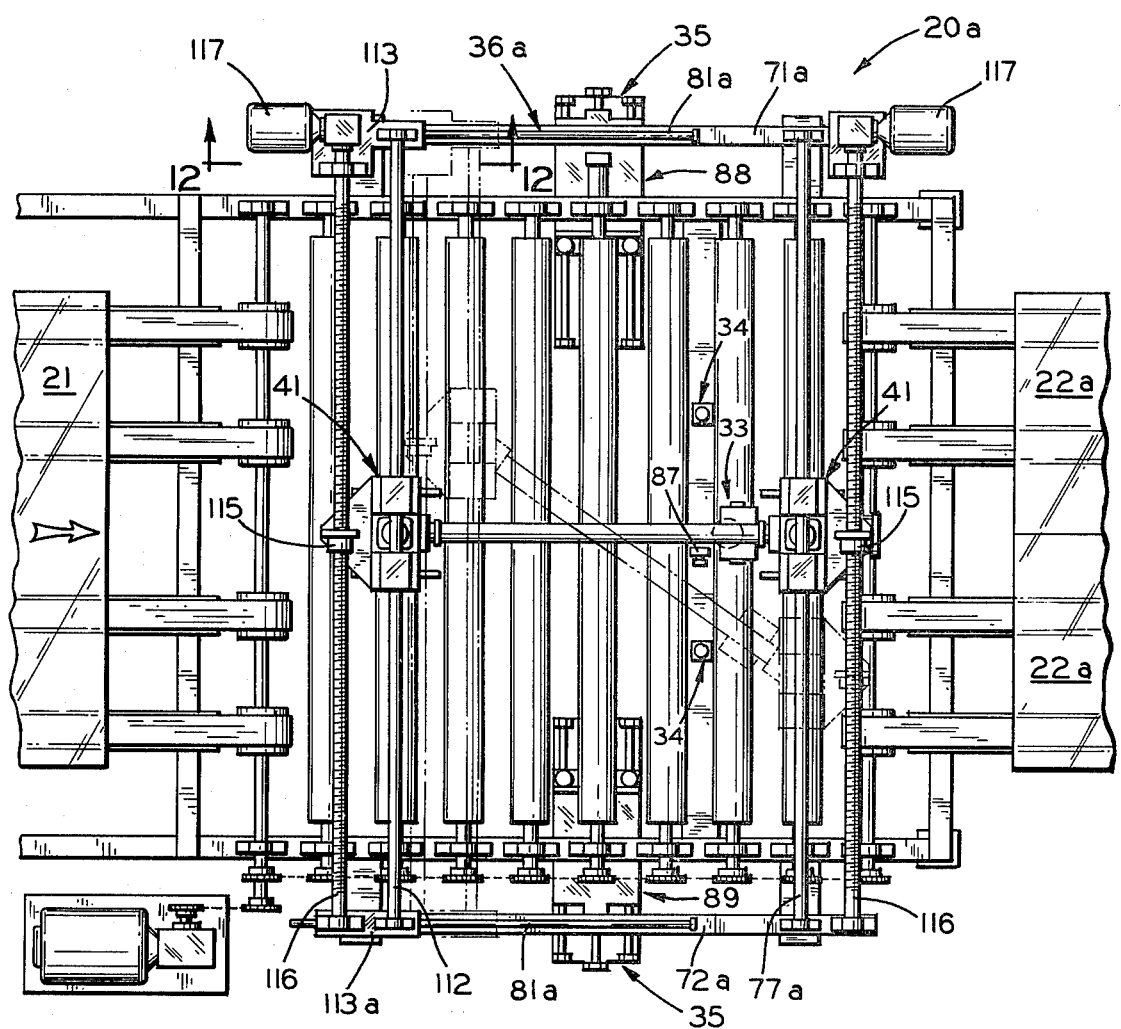
FIG. 9 is a plan view of another embodiment of an apparatus constructed in accordance with the invention for scoring glass sheets.
Figure 10:
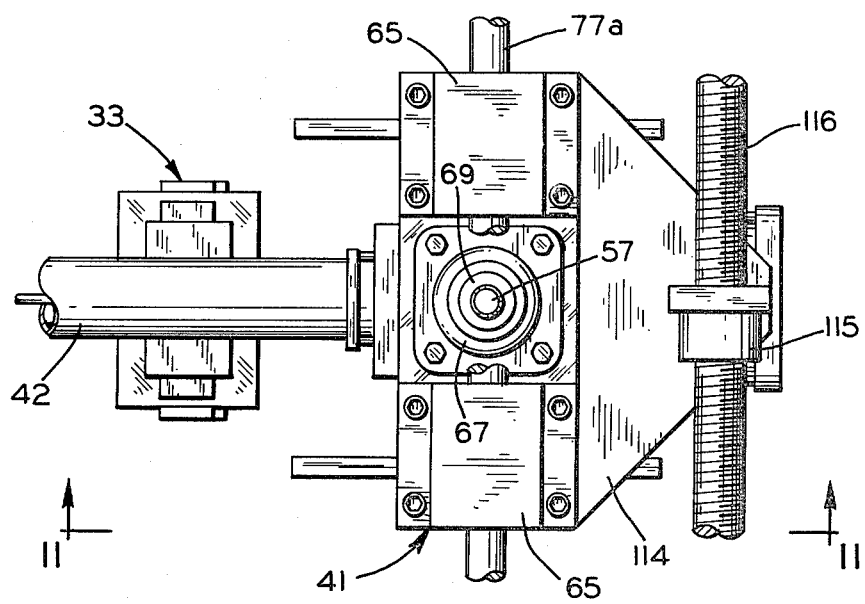
FIG. 10 is an enlarged fragmentary plan view of one end of the cutting unit employed in the embodiment illustrated in FIG. 9.
Figure 11:
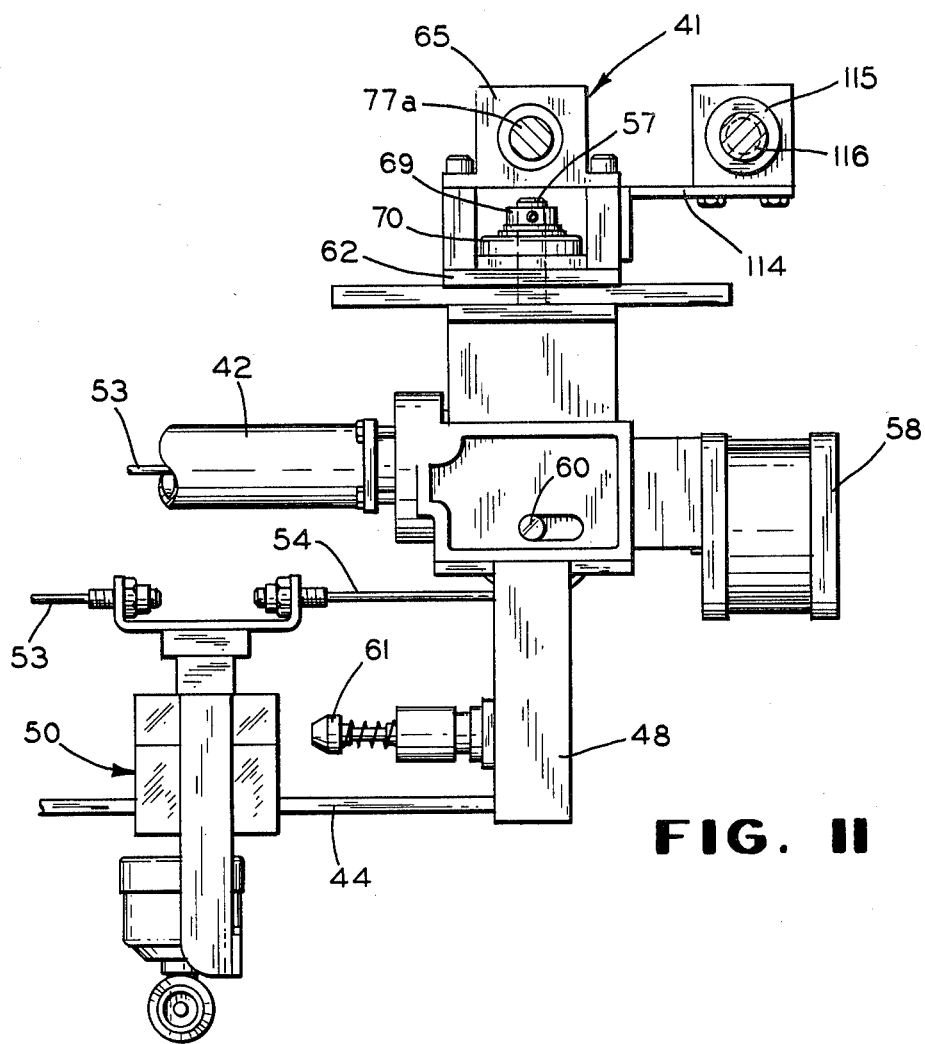
FIG. 11 is an enlarged fragmentary elevational view looking in the direction of line 11—11 in FIG. 10.
Figure 12:
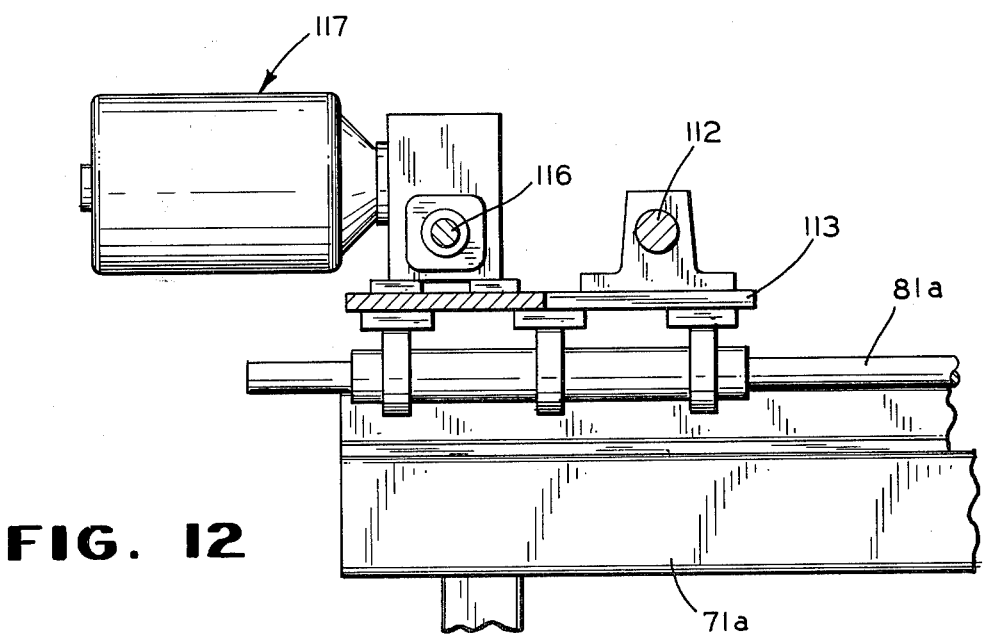
FIG. 12 is an enlarged fragmentary elevational view looking in the direction of line 12—12 in FIG. 9.

In this embodiment of the invention and referring to FIGS. 10 and 11, each hanger 41, slidably mounted on the rails 77a and 112, is provided with a bracket 114 on which a travelling nut 115 is mounted in known manner. A power driven lead screw 116 is provided adjacent each hanger 41 to engage the nut 115 for moving the hangers 41 transversely of the longitudinal path of the roll conveyor 29. Each lead screw 116 is rotated in either direction of rotation by a right angle gear reduction and drive unit 117. More specifically, as illustrated in FIG. 9, the lead screw 116 provided at the downstream end of the frame 36a is fixed to the beams 71a and 72a in the manner previously described.

The power driven lead screw 116 provided at the upstream end of the frame 36a is mounted on the slides 113 and 113a. The drive unit 117 at the downstream end of the frame 36a is mounted on the beam 71a thereof and the drive unit 117 at the upstream end of the frame 36a is mounted on the slide block 113 to move therewith. In all other respects, this embodiment of the invention is the same as the embodiment previously described.

From the foregoing description, it may be readily seen that block size glass sheets may be advanced to and from a scoring station by a continuously operating conveying line wherein a glass sheet is captured and accurately positioned upon an operating roll conveyor beneath a scoring tool, scored and released to be quickly carried away from the scoring station. Accordingly, the apparatus described has a fast cycle time and can quickly score glass sheets into pattern blanks of various sizes and shapes.

It is to be understood that the forms of the invention herewith shown and described are to be taken as illustrative embodiments only of the same, and that various changes in the shape, size and arrangement of the parts may be resorted to without departing from the spirit of the invention.

We claim:

1. A method of scoring glass sheets comprising the steps of:
   a. advancing a glass sheet on a continuously running conveyor along a rectilinear path through a scoring station;
   b. capturing the glass sheet at the scoring station and holding the sheet stationary on the running conveyor;
   c. selecting at least one path along which the captured sheet is to be scored at an angle other than 90° relative to said rectilinear path;
   d. scoring the upper surface of said captured sheet along said at least one path; and
   e. releasing the scored glass sheet whereupon the sheet is quickly conveyed away from the scoring station.

2. A method of scoring glass sheets as claimed in claim 1, wherein two non-intersecting paths are selected and score lines are produced along said two paths.

3. A method of scoring glass sheets as claimed in claim 1 or claim 2, including the step of transversely shifting the captured glass sheet to a predetermined location beneath the scoring station.

4. An apparatus for scoring glass sheets, the apparatus comprising:
   a. a scoring station;
   b. a continuously operating means for conveying the glass sheets along a rectilinear path beneath said scoring station and for supporting the glass sheet at said scoring station;
   c. means for capturing and holding the glass sheet in a stationary position at the scoring station during scoring of the glass sheet;
   d. at least one guide rail extending along the rectilinear path at an angle other than 90° relative thereto, and bridged over the glass sheets above said predetermined location;

e. means for positionably suspending said guide rail above said conveying means above said predetermined location of the glass sheet; and f. a scoring tool movable along said guide rail for scoring the captured glass sheet along a predetermined path.

5. An apparatus for scoring glass sheets as claimed in claim 4, wherein said continuously operating means includes a driven roll conveyor and said capturing means comprises a pair of vertically movable stop pins extendable between an adjacent pair of rolls of said roll conveyor.

6. An apparatus for scoring glass sheets as claimed in claim 5, wherein each said stop pin comprises a piston rod of a power cylinder.

7. An apparatus for scoring glass sheets as claimed in claim 5, wherein said means for suspending said guide rail comprises an overhead frame fixed above said roll conveyor, a pair of depending hangers movably mounted on said frame, means for slidably mounting said hangers on said frame, and means for pivotally mounting said guide rail on said hangers.

8. An apparatus for scoring glass sheets as claimed in claim 7, wherein said slidably mounted means comprises a pair of parallel, transversely extending, longitudinally extending rails, one of said rails being fixedly secured to said overhead frame and the other said rail being mounted for longitudinal movement relative to said frame.

9. An apparatus for scoring glass sheets as claimed in claim 4, including means for transversely moving the captured glass sheet to a predetermined location at the scoring station.

10. An apparatus for scoring glass sheets as claimed in claim 9, wherein said means for transversely moving the sheet comprises an adjustable abutment device disposed on one side of said roll conveyor and a pusher device disposed along the opposite side of said roll conveyor and in alignment with said abutment device.

11. An apparatus for scoring glass sheets as claimed in claim 10, wherein said adjustable abutment device comprises a pair of longitudinally spaced vertically extending stop pins and said pusher device comprises a movable member, a pair of vertically extending pusher pins fixed on said movable member and a power cylinder connected thereto for moving said movable member to and fro along a rectilinear path.

* * * * *